No. 637,771. Patented Nov. 28, 1899.
C. J. EHBETS.
VEHICLE BRAKE.
(Application filed Apr. 6, 1899.)
(No Model.)
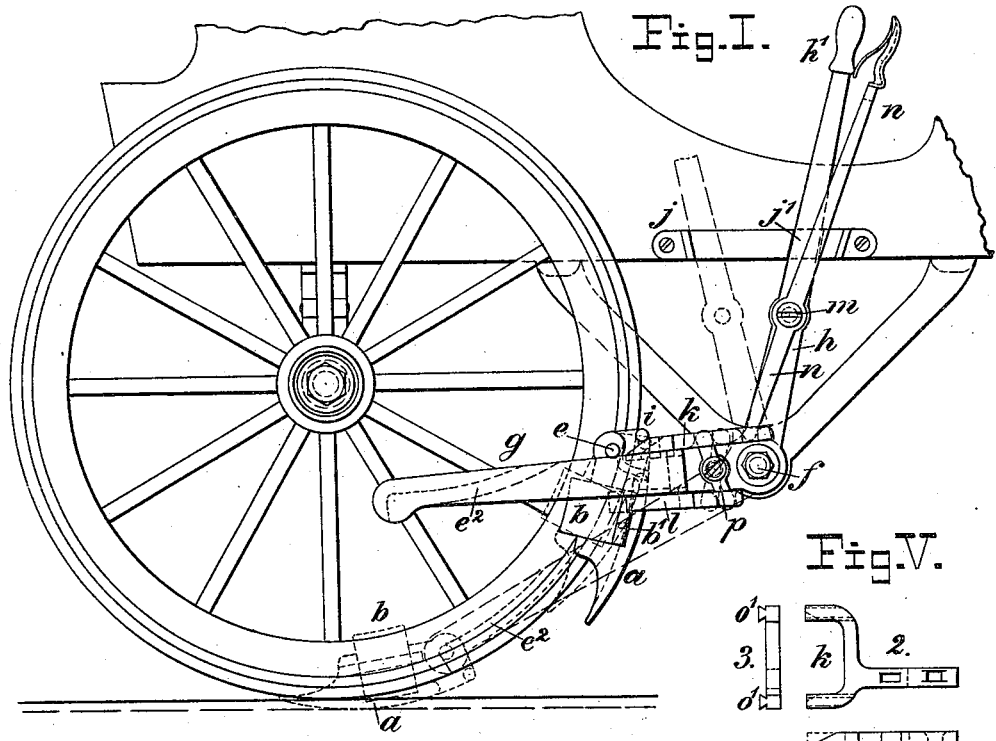
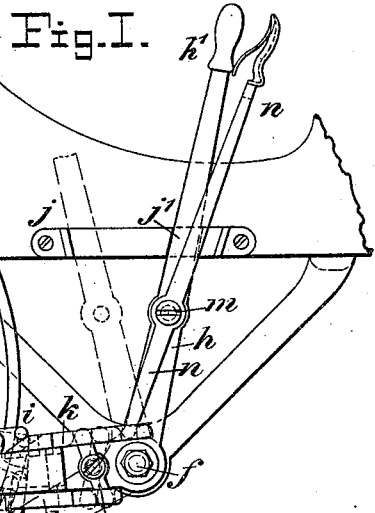
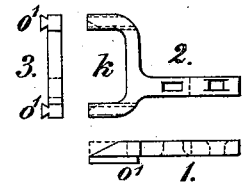
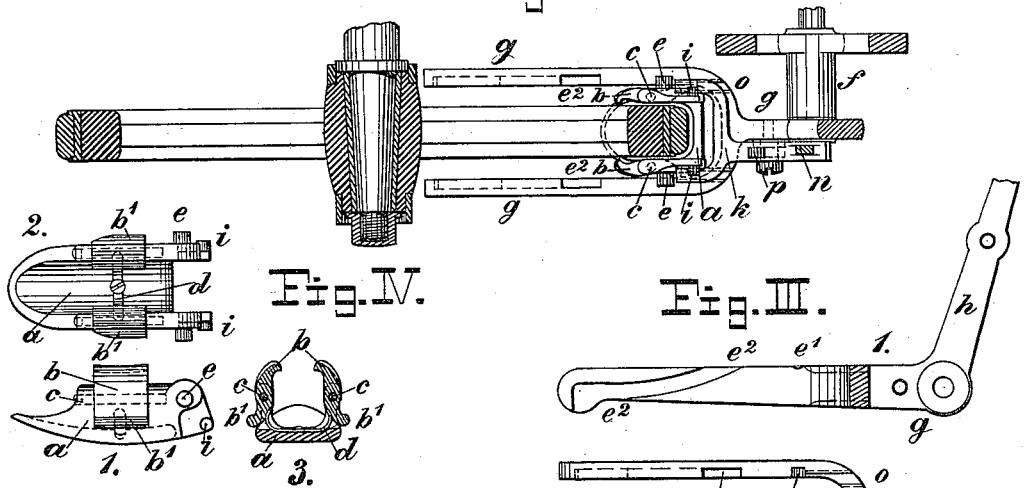
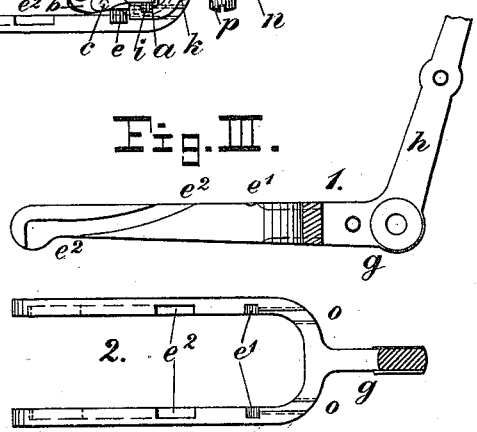
Witnesses.
Inventor.
Carl J. Ehbets.

UNITED STATES PATENT OFFICE.

CARL J. EHBETS, OF HARTFORD, CONNECTICUT.

VEHICLE-BRAKE.

SPECIFICATION forming part of Letters Patent No. 637,771, dated November 28, 1899.

Application filed April 6, 1899. Serial No. 711,968. (No model.)

*To all whom it may concern:*

Be it known that I, CARL J. EHBETS, a citizen of the United States, residing at Hartford, in the county of Hartford and State of Connecticut, have invented a new and useful Vehicle-Brake, of which the following is a specification.

My invention relates to improvements in brakes for vehicles; and the objects of my improvements are, first, to provide a brake which when brought into operation on the vehicle-wheel arrests the progress of the vehicle without exposing the tire of the wheel to injurious frictional contact with the ground, but which, on the contrary, protects the tire against such contact, and, second, to provide a brake which may at will be thrown into full operation on the wheel to entirely arrest the progress of the vehicle or which may be brought gradually into operation on the wheel in such manner as to impede and retard the progress of the vehicle without entirely arresting it. I attain these objects by mechanism such as that chosen for illustration in the accompanying drawings, in which—

Figure I represents a side elevation of parts of the running-gear of a vehicle with an embodiment of my brake in the position of rest when not in use, the operative position of my brake and an intermediate position of the brake-shoe being indicated in dotted lines. Fig. II is a substantially horizontal section of a vehicle-wheel and a top view of the brake mechanism, showing some parts in horizontal section. The mechanism is in the position of rest. Fig. III shows the brake-lever detached—at 1 a vertical section, and at 2 a top view partly in horizontal section. Fig. IV shows the brake-shoe detached—at 1 a side elevation, 2 a top view, and 3 a vertical transverse section looking rearward. Fig. V shows the top slide detached—at 1 a side elevation, 2 a top view, and 3 a rear end view.

Similar letters refer to similar parts throughout the several views.

My improved brake belongs to that class in which a brake-shoe or drag is carried attached to the vehicle normally in an inoperative position, but so that it may be brought into operation as the occasion arises. When put into use, the drag is lowered to the ground in front of the wheel, so that the latter rolls onto the drag, which is then retained in its position beneath the wheel and prevents the same from rolling over the ground and at the same time protects the tire of the wheel from contact with the latter. When the occasion for the use of the brake has passed, the drag is released, the wheel is allowed to roll from it, and the drag is returned to its place of rest.

While the application of a drag as described has heretofore generally necessitated the stoppage of the vehicle both before applying it and for removing it, my improvements make such stoppage unnecessary.

My improved brake comprises a brake-shoe or drag and suitable mechanism for bringing it into operation beneath the wheel in a position similar to that of the above-described drag and for retaining it there to act as a brake by its contact with the ground and at the same time to protect the tire from such contact. When no more required, the drag may be released and automatically returned to its position of rest ready for use again without requiring the vehicle to be stopped. Besides its use as a drag beneath the wheel my construction enables me at will to make use of the brake-shoe by causing it to press upon the periphery of the wheel at a point above the ground, and thus by friction to prevent the free rotation of the wheel. By this variable application of my brake the motion of the vehicle may be either gradually retarded or suddenly arrested, accordingly as the brake is caused to perform the functions of a friction-brake shoe or those of a drag.

I will now describe my invention with special reference to the construction shown in the drawings, which has been chosen as illustration of a convenient and practical embodiment thereof.

The brake-shoe or drag $a$ (shown detached in Fig. IV at 1, 2, and 3) is formed to closely fit upon the rim of the wheel, and when in position beneath the latter the drag for some distance clasps the circumference and the sides of the wheel, while presenting a large exterior surface for contact with the ground. Fitted in recesses in the sides of the drag are the jaws $b$ $b$, which turn upon the longitudinal pivot-pins $c$ $c$, and a spring $d$, seated in a transverse groove in the interior of the drag, serves to yieldingly force the tops of the jaws inward. (See section 3 of Fig. IV.) Both jaws have a rib $b'$ parallel to and below their pivot-pins, which normally project beyond the sides of the drag and pressure upon which will turn the jaws, so as to move the tops outward. The inner sides of the jaws conform to the shape of the rim of the wheel, and when the drag is placed upon the circumference of the wheel the jaws clasp the rim and serve to attach the drag to the wheel, so that on rotation of the wheel the drag will remain in close contact and move with the circumference of the wheel until the clasp of the jaws is released, as by inward pressure upon the projecting ribs $b'$. The rear portion of the ribs $b' b'$ is cut away, so as to incline rear and inward. (See the top view 2 of Fig. IV.)

The position of the drag upon the rim of the wheel is shown in dotted lines in Fig. I.

The clasp of the spring-jaws to affix the drag upon the wheel needs only to be strong enough to support the weight of the drag. When the drag is beneath the wheel, the pressure of the rim upon the jaws below their pivots prevents the jaws from losing their grasp upon the rim, and rotation of the wheel will carry the drag from beneath it and rear and upward with the rim of the wheel unless the drag is positively retained in the position between the wheel and the ground. Forward of the jaws on each side of the drag is a partly-circular boss, from which projects a stud $e$. The bottom of the drag does not extend as far forward as do the sides, and thus the studs $e\ e$ project beyond the sides and in front beyond the bottom of the drag. (See the top view 2 of Fig. IV.) Below the studs $e\ e$ the sides of the drag are reduced in thickness, and at their lower forward edges are provided the studs $i\ i$, which are smaller and shorter than the studs $e\ e$.

Upon a pivot $f$, firmly supported by the frame of the vehicle in front of the wheel, is mounted the brake-lever. It consists of the horizontal arm $g$ and the vertical arm $h$ and, as will appear hereinafter, constitutes a means to check the movement of the drag or brake-shoe with the rim of the wheel and to secure it in the inoperative position, to release the drag, guide it to and retain it in the operative position. The arm $g$ of the lever extends from the pivot to the wheel, and it is preferably bifurcated, so as to extend both inside and outside of the wheel. The arm $h$ of the lever extends upward from the pivot and is furnished with a handle $h'$, by which it may be conveniently grasped and moved forward and rearward for raising and lowering the arm $g$.

A plate $j$ on the frame of the vehicle is provided with projections in the path of the lever-arm $h$ and serves to limit the movements of the same. Besides these projections the plate $j$ has a shallow notch $j'$, in which the lever-arm may be placed to rest somewhat in rear of its extreme forward position and from which it may be released by a slight effort in lateral direction, a construction too well known to require further description. When the lever-arm $h$ rests in the notch $j'$, the arm $g$ is raised, (see Figs. I and II,) and the space between its two branches being somewhat wider than the body of the drag $a$ the latter, if attached to the rim of the wheel, would by the rotation of the same be carried through between these branches; but as the ribs $b' b'$ of the jaws project from the sides of the drag the ribs in passing between the branches of the lever-arm impinge upon them, and thereby cause the jaws to turn on their pivots and to release their clasp upon the rim of the wheel. The inclined rear portion of the ribs $b'$ causes this opening movement of the jaws to take place gradually and easily, so that when the projecting studs $e\ e$ on the forward end of the drag come in contact with the top of the lever-arm $g$ the jaws are fully opened, and consequently the drag is detached from the wheel and hangs by the studs $e\ e$ upon the lever-arm $g$, as indicated in dotted lines in Fig. I. In this position the drag while disengaged from the wheel is yet resting against it. To remove it from contact with the wheel, I fit upon the upper surface of the lever-arm $g$ the slide $k$, which extends from the lever-pivot rearward to the drag, where it is bifurcated, so as to bring one of its branches in front of each of the small studs $i\ i$ on the drag. To the outside of the lever-arm $h$ is pivoted at $m$ a secondary lever $n$, its upper end near the handle of lever $h$ and its lower end connected with the slide $k$. A spring between the handle $h'$ and the lever $n$ normally turns the lever $n$ from the handle $h'$ and moves the lower end of $n$ and the slide $k$ toward the wheel.

As shown in Fig. V, the ends of the branches of the slide $k$ incline downward, so as to form wedges in front of and below the studs $i\ i$, and the rearward movement of the slide $k$, caused by the spring and the lever $n$, forces the wedges between the lever-arm $g$ and the studs $i\ i$ and, raising these, causes the drag to turn on the studs $e\ e$ as an axis and moves the drag from the position shown in dotted lines to that shown in the full lines, and thereby removes the drag from all contact with the wheel to a position of rest. To facilitate the turning of the drag on the studs $e\ e$, I provide in the top of the lever-arm $g$ two parti-circular recesses $e'\ e'$, corresponding to the position of the studs $e\ e$ and into which the latter enter while resting upon the lever. For a convenient attachment of the slide $k$ to the lever-arm $g$ I provide two dovetailed grooves $o\ o$ in the branches of the lever-arm $g$ and correspondingly-shaped ribs $o'\ o'$ beneath the branches of the slide $k$, which ribs enter said grooves and secure and guide the slide upon the lever-arm $g$. These grooves are plainly shown in the views of the detached lever in Fig. III and the ribs in the slide in Fig. V. To the under side of lever-arm $g$ I secure in a similar manner, by dovetailed ribs $o'\ o'$ and grooves $o\ o$, the lower slide $l$, which is the counterpart of the top slide $k$, except that its front end is shorter and that the branches at its rear end instead of being inclined on top are beveled on the inner sides, so as to partly clasp the portion of the drag depending below the lever-arm $g$ when in the position shown in Fig. I. These deviations in the form of the slide $l$ from that of the slide $k$ are indicated in dotted lines in Fig. V. To the side of the lever-arm $g$, between the upper and lower slides, I pivot upon a screw the short two-armed lever $p$, which is connected with both slides and communicates the movements of the top slide to the lower slide in the reversed direction.

To move the drag from the position of rest to the operative position, the handle of the lever $h$ is grasped, and with it the end of lever $n$, and the latter is thereby moved toward lever $h$. This moves the lower end of lever $n$, and with it the slide $k$, forward away from the drag and withdraws the wedge-shaped branches from beneath the studs $i\ i$. At the same time the lower slide $l$ is moved rearward against the drag. These motions cause the drag to turn on the studs $e\ e$ until it rests against the circumference of the wheel. If now the lever-arm $h$ is freed from the notch in plate $j$ and is moved rearward, the lever-arm $g$ moves down and forward and the ribs $b'\ b'$ thereby escape from the lever $g$ and from the slide $l$, and the released jaws $b\ b$ close and affix the drag to the wheel. The continued downward movement of the lever-arm $g$ causes it to incline downward, so as to facilitate the escape of the studs $e\ e$ from the recesses in the lever, and on rotation of the wheel the drag is carried down by the wheel, the studs $e\ e$ sliding downward upon the top of the lever-arm, while the shorter studs $i\ i$ pass between the branches of the same. When the lever-arm $g$ arrives at its lowest position and the drag has been carried to the point where the lever-arm extends inward beyond the rim of the wheel and the studs $e\ e$ cannot slide farther downward upon the lever-arm, grooves $e^2\ e^2$ are provided in the inner sides of the branches of the lever-arm deep enough to clear the ends of the studs $e\ e$ and substantially concentric with the circumference of the wheel. The continued rotation of the wheel carries the studs $e\ e$ into these grooves and through them to the ends of the lever-arm.

As seen in Fig. III, the grooves $e^2\ e^2$ are in rear open at the bottom, but not at the top. The branches of the lever-arm $g$ are at the ends increased to a parti-circular form, within which recessed seats for the studs $e\ e$ are provided, in which the grooves $e^2\ e^2$ terminate, thus forming in rear strong hooks. While the studs $e\ e$ pass through the grooves $e^2\ e^2$ the bottom of the drag is drawn beneath the wheel, and as it arrives at the operative position between the wheel and the ground (shown in dotted lines in Fig. I) the studs enter their seats in the lever-arm, are there retained by said hooks, and thus secure the drag beneath the wheel.

To release the drag, the levers $h$ and $n$ are grasped, brought together, and moved forward. Thereby the lever-arm $g$ is raised and the drag released. Rotation of the wheel carries the drag rearward and upward to the position shown in dotted lines, where the lever stops and releases it, and on the release of the lever $n$, as in Fig. I, the drag is again secured in its inoperative position, as above described.

In order to apply the drag as a friction brake-shoe, the levers $h$ and $n$ are grasped and brought together, thus causing the top and lower slides to turn the drag on the studs and against the wheel. Now the lever $h$ is freed from the notch and forced forward. This action tends to raise the lever-arm $g$, and with it the brake-shoe, while the latter is pressed against the rim of the wheel. In this manner the pressure of the brake-shoe is exerted to restrain the rotation of the wheel, and its effect is only limited by the power with which it may be applied. By bringing the brake-lever back to the notch the brake-shoe may be again returned to rest, or by throwing the brake-lever fully rearward the drag may be again thrown into operation.

The interior of the drag may be so shaped that in case an elastic tire is used on the wheel the frictional contact will be exerted only on the metallic tire below the elastic one. The interior of the jaws may be lined with suitable material in case the brake is applied to a wood-rimmed wheel, so as to prevent the clasp of the jaws from injuring the rim of the wheel.

While I prefer the spring-actuated jaws as the means for causing the drag to cling to and rotate with the wheel when freed from the hold of the brake-lever, it will be evident that various devices of a different kind may be employed for that purpose and that various devices may be employed to forcibly press the brake-shoe against the circumference of the wheel when it has been raised by the brake-lever to a position favorable to its performing the functions of a friction brake-shoe and that various changes in the form and arrangement of the several parts may be made without departing from the spirit of my invention.

What I claim as my invention, and desire to secure by Letters Patent, is—

1. An independent brake-shoe, provided with means to yieldingly support it in close contact with the tire of a vehicle-wheel, so as to revolve therewith.

2. An independent brake-shoe, and means carried by said brake-shoe to yieldingly support it upon the circumference of a vehicle-wheel, so as to revolve therewith.

3. An independent brake-shoe provided with jaws for clasping the rim of a vehicle-wheel, means for actuating said jaws to support said brake-shoe upon the circumference of said wheel so as to revolve therewith.

4. In a vehicle-brake, the combined brake-shoe and tire-guard, means carried by said brake-shoe to support it solely upon the circumference of the wheel so as to revolve therewith, means to retain said brake-shoe in operative position and to detach said brake-shoe from the wheel and to support it free from contact with said wheel.

5. In a vehicle-brake, a brake-shoe provided with jaws to yieldingly clasp the rim of the wheel to move therewith to and from a position between the wheel and the ground, means to open said jaws and to detach said brake-shoe from the wheel to retain the same out of said position, and to release said brake-shoe for movement thereto and to retain said brake-shoe in said position.

6. A vehicle-brake comprising a brake-shoe provided with jaws to yieldingly clasp the rim of the wheel to move therewith, means to check the movement of said brake shoe and to support the same in frictional contact with the tire of said wheel.

7. A vehicle-brake comprising a brake-shoe provided with jaws to yieldingly clasp the rim of the wheel to move therewith, and provided with lateral projections, and a brake-lever supported by the vehicle-body and extending to the sides of said wheel and into the path of said projections, said brake-lever provided with means to open said jaws and to detach said brake-shoe from said wheel, and provided with openings for the passage of said projections, and with hooks for engaging said projections, whereby, as the brake-lever is moved to the operative position, said brake-shoe is retained between the wheel and the ground, and as said brake-lever is moved out of the operative position, said brake-shoe is released for movement with the wheel, and detached from said wheel and supported out of contact with said wheel.

8. A vehicle-brake comprising a brake-shoe having spring-actuated jaws to clasp the rim of the wheel, said jaws provided with projecting ribs, said brake-shoe having studs projecting from its sides, and a brake-lever supported by the vehicle-frame and extending to the sides of the wheel and into the path of said projecting ribs and studs, said brake-lever provided with movable top and lower slides, and with openings for the passage of said studs, and having hooks for engaging said studs, substantially as and for the purpose specified.

This specification signed and witnessed this 1st day of April, A. D. 1899.

CARL J. EHBETS.

In presence of—
JAS. S. BRYANT,
R. L. PEARD.